(12) United States Patent
Dubois et al.

(10) Patent No.: US 8,911,835 B2
(45) Date of Patent: Dec. 16, 2014

(54) METHOD AND SYSTEM FOR INJECTING LIQUID IN A POROUS MATERIAL

(75) Inventors: Pierre-Marie Dubois, Ophain-bois-seigneur-isaac (BE); Daniel Michaux, Livry Gargan (FR)

(73) Assignee: PMD-ATEAV Systems SPRL, Ophain-bois-seigneur-isaac (BE)

( * ) Notice: Subject to any disclaimer, the term of this patent is extended or adjusted under 35 U.S.C. 154(b) by 164 days.

(21) Appl. No.: 13/576,507

(22) PCT Filed: Feb. 1, 2010

(86) PCT No.: PCT/EP2010/051205
§ 371 (c)(1),
(2), (4) Date: Oct. 12, 2012

(87) PCT Pub. No.: WO2011/091862
PCT Pub. Date: Aug. 4, 2011

(65) Prior Publication Data
US 2013/0052367 A1 Feb. 28, 2013

(51) Int. Cl.
*B01J 19/08* (2006.01)
*C04B 41/50* (2006.01)
*E04G 23/02* (2006.01)
*C04B 41/65* (2006.01)
*C04B 41/00* (2006.01)
*C04B 111/00* (2006.01)
*C04B 111/26* (2006.01)

(52) U.S. Cl.
CPC ... *E04G 23/0203* (2013.01); *C04B 2111/00112* (2013.01); *C04B 41/5009* (2013.01); *C04B 41/65* (2013.01); *C04B 41/009* (2013.01); *C04B 2111/26* (2013.01)

USPC .......................................................... 427/560

(58) Field of Classification Search
CPC .. C04B 41/009; C04B 41/65; C04B 41/5009; C04B 32/02
USPC .......................................................... 427/560
See application file for complete search history.

(56) References Cited

U.S. PATENT DOCUMENTS

| | | | |
|---|---|---|---|
| 4,605,572 A * | 8/1986 | Omata et al. | 427/403 |
| 5,228,959 A | 7/1993 | Miller | |
| 5,422,141 A | 6/1995 | Hoopes et al. | |
| 5,427,819 A | 6/1995 | Weyers et al. | |
| 5,840,247 A * | 11/1998 | Dubois et al. | 422/7 |

FOREIGN PATENT DOCUMENTS

| | | |
|---|---|---|
| EP | 0 733 757 A1 | 9/1996 |
| GB | 1 479 020 A | 7/1977 |
| GB | 1 480 718 A | 7/1977 |
| GB | 1 495 158 A | 12/1977 |

* cited by examiner

*Primary Examiner* — Dah-Wei D Yuan
*Assistant Examiner* — Nga Leung V Law
(74) *Attorney, Agent, or Firm* — The Marbury Law Group, PLLC

(57) ABSTRACT

The present invention relates to a method for injecting a liquid in a porous material or a material including discontinuity interfaces, wherein said method includes the steps of: attaching an injection part to said material, the injection part defining a compression chamber with at least one surface of said material; injecting said liquid into said compression chamber under a low pressure; and applying a high-power acoustic wave to said liquid using a drawing element, wherein said drawing element extends into said compression chamber.

13 Claims, 3 Drawing Sheets

METHOD AND SYSTEM FOR INJECTING LIQUID IN A POROUS MATERIAL

OBJECT OF THE INVENTION

The invention relates to the field of treatments of solid materials, in particular in the injection of liquid into porous materials, or comprising discontinuity interfaces, in order to improve the properties thereof.

In particular, the present invention relates to the protection against oxidation effects of active or passive frames embedded in a mass of concrete, said frames being notably in the form of an assembly of wires, strands or metal bars either arranged in a sheath, or without any sheath.

STATE OF THE ART

It is well known to one skilled in the art that construction materials subject to outdoor conditions tend to degrade; whether this be a cracking process due to frost and humidity, a corrosion process of frames in concrete or other aggressions.
Confronted with these potential degradations, one skilled in the art applies different methods.

In order to limit infiltrations into concrete of water contaminated with products such as chlorides, frost effects or the effects of carbonation of air, removing the degraded portions of the concrete and applying a repair coating are well known methods. These have the drawback of treating the concrete only superficially.

Within the scope of structures reinforced by metal frames either pre-stressed or not, degraded by corrosion, various other solutions have been proposed.

Patent U.S. Pat. No. 5,427,819 describes a method for restoration of reinforced concrete in which the major portion of the concrete is removed from above a frame to be treated, the remaining concrete in close proximity to the frame is saturated with a corrosion inhibitor specific to corrosion due to chlorides, and finally a mortar having low permeability is replaced, instead of the concrete removed in the first step. In case of a reinforced concrete undergoing generalized corrosion, this method is complex and costly.

Patent U.S. Pat. No. 5,422,141 describes a composition for restoration of reinforced concrete comprising corrosion inhibitors and penetration agents of the composition, this composition being applied from the surface of the reinforced concrete. If diffusion of said composition is insufficient, penetration of the composition is improved by scarification of the surface to be treated, this scarification may come as near as about 1 cm from the frames to be treated.

Another known strategy of one skilled in the art consists in cathodic protection of frames as described in document U.S. Pat. No. 5,228,959. The drawback of this type of method is to require regular follow-up for the whole lifetime of the structure, and its application is very expensive. Further, it is not suited for treating pre-stressed frames which risk embrittlement.

Patent EP0733757 describes a method for impregnating pre-stressed concretes in which a solution containing corrosion inhibitors is injected at low pressure in holes drilled as far as the frames to be treated. Penetration of the treatment solution is assisted by applying an acoustic wave within the liquid and generated by a power ultrasonic pump in an external compression chamber. This method has the drawback that these ultrasonic waves undergo damping depending on the treatment depth. This patent does not either describe any method for surface treatment of reinforced concretes.

OBJECTS OF THE INVENTION

The present invention is directed to providing a method and a system for injecting liquid into porous materials or comprising discontinuity interfaces such as concretes, stones, and which does not have the drawbacks of the prior art.

The present invention is particularly directed to the impregnation in depth of surfaces or discontinuities of these materials, in particular in proximity to reinforcing structures, more particularly metal frames and pre-stressed cables.

SUMMARY OF THE INVENTION

A first aspect of the present invention relates to a method for injecting a liquid into a porous material or comprising discontinuity interfaces, said method comprising the steps of:
  attaching an injection part to said material, said injection part delimiting with at least one surface of said material a compression chamber;
  injecting said liquid into said compression chamber and applying to said liquid an acoustic high power wave by means of a pulsating element, said pulsating element being extended right into said compression chamber.

According to preferred embodiments of the invention, the method for injecting liquid includes at least one, or any suitable combination of the following features:
  the compression chamber is essentially delimited by the walls of a cavity of the material;
  prior to attachment of the injection part to the material, the cavity is pierced in said material;
  the material comprises one or several metal reinforcement structures, the cavity pierced in the material not opening out onto the metal reinforcing structure of said material;
  the material comprises one or several metal reinforcement structures, the cavity pierced in the material opening onto the metal reinforcing structure of said material;
  said material comprises concrete;
  said material comprises one or several metal reinforcing structures;
  the liquid comprises corrosion inhibitors;
  the liquid comprises nitrites and said liquid is at a pH comprised between 10 and 12.5;
  the liquid comprises a coloring agent;
  said material comprises metal assemblies comprising metal-on-metal interfaces (11);
  the high power acoustic wave has a frequency of more than 20 kHz.
  one or several vacuum enclosures are used, positioned on one or several surfaces of the material, which are depressurized, thereby facilitating transport of the liquid through the porous material or the discontinuity interfaces present in the porous material.

Another aspect of the invention relates to a system allowing application of the method of the invention and comprising:
  a high power acoustic wave source comprising a pulsating element;
  an injection part allowing injection of pressurized liquid, said injection part comprising one or several attachment means capable of attaching said injection part on a porous material and said injection part being able to form with a surface of the material, a compression chamber against or in said porous material;

characterized in that the pulsating element protruding from the injection part is capable of generating an acoustic wave within said compression chamber.

In a preferred embodiment of the invention, the pulsating element slides relatively to the injection part so as to be able to adjust its position, by means of a sliding support.

The present invention also discloses a system allowing application of the method as described above and comprising:
- a high power acoustic wave source comprising a pulsating element;
- an injection part allowing injection of the liquid, said injection part comprising one or several attachment means capable of attaching said injection part onto a metal assembly and said injection part being able to form with a surface of the assembly at right angles to an interface a compression chamber against said assembly;

characterized in that the pulsating element protruding from the injection part, is capable of generating an acoustic wave within said compression chamber allowing the metal interface to be treated.

SHORT DESCRIPTION OF THE FIGURES

FIG. 1 describes a particular embodiment of the present invention in case of treatment of reinforced or pre-stressed concrete.

DETAILED DESCRIPTION OF THE INVENTION

A first object of the present invention relates to a method for injecting a liquid into a porous material wherein said liquid is injected into a compression chamber at least partly forming a surface of said material to be treated. A particularity of the invention consists in assisting the penetration of the liquid by applying a high power acoustic wave. Preferably, the power is sufficient for causing a cavitation phenomenon in the vapor phase. The ultrasonic power density within the liquid is greater than 5 W/L, preferably greater than 10 W/L. Preferably, the frequency of the injected ultrasonic waves is comprised between 20 and 100 kHz.

Figure 1:
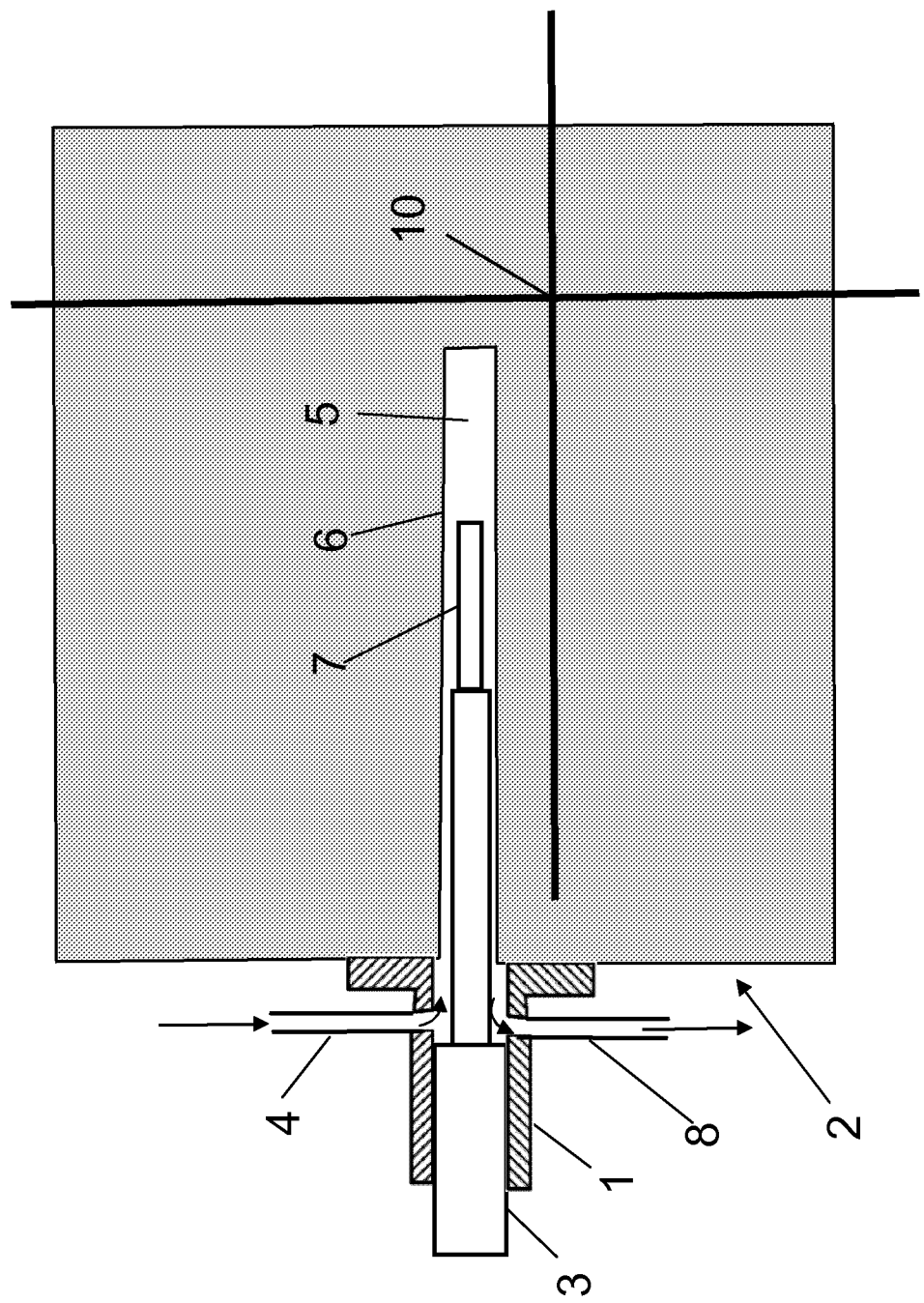

Preferably, the invention relates to a method wherein an acoustic wave is generated in close proximity to the location of the porous material to be treated, in a compression chamber formed by at least one surface 6 of said material (FIG. 1). This method may be applied in proximity to outer surfaces of said material either in depth in said material and in particular either in proximity to metal reinforcing frames, or in pre-stressed cables, via a compression chamber formed in a cavity 5 made in said material (see FIG. 1). This cavity may for example be obtained by drilling. With this method, it is therefore possible i.a. to protect metal structures of reinforced concretes without modifying the aspect thereof, except for the surface repairs made in alterations of these concretes. The drilled cavity may be either tube-encased or not.

In a particular embodiment of the present invention, used for treating reinforced or pre-stressed concretes, the acoustic wave appears as power ultrasonic waves generating cavitation in the vapor phase. Advantageously, additional stripping of the corrosion products of the metal frames may then be obtained. Preferably, for treating pre-stressed or reinforced concretes, a chamber is generated by making a perforation in the concrete, and advantageously emerging on the metal frames to be treated or in proximity thereto.

In a preferred embodiment of the invention, the source of power ultrasonic waves is positioned in close proximity to the frames to be treated in order to promote, by the vibration generated by the ultrasonic waves, migration of a liquid such as a corrosion inhibitor.

In another embodiment of the invention, the liquid is injected into the porosity of the material in order to impregnate the volumes to be treated.

The method of the present invention may also be used for obtaining injection of liquid between two surfaces of structures, such as for example nodes for assembling metal frames. A compression enclosure, as described above, is then applied at the location of the interface.

The injected liquid penetrates in depth, even with very close interfaces of about a few tens of microns.

The injection pressure of the liquid is adapted to the mechanical strength with regard to bursting of the material. For concrete, it is limited to a few bars. For other materials, it may be adapted to the resistance capabilities of the treated material.

Finally, when both faces of the material to be treated are accessible, it may be useful to place a second device comprising an enclosure placed on a surface opposite to the surface on which the liquid injection system of the invention is positioned and to generate vacuum in this second enclosure so as to improve migration of the liquid into the material. Vacuum may also be applied on the front or side surface surrounding the ultrasonic device.

The nature of the injected liquids depends on the problem to be treated: these may be corrosion inhibitors in case of reinforced or pre-stressed concretes, or other products allowing for example reduction in the porosity of the material after treatment, without these impregnation examples being limiting.

Among corrosion inhibitors, those based on nitrite, such as calcium or sodium nitrites, are particularly suitable for treating reinforcement structures such as metal frames or cables subject to corrosion in the presence of chloride, the latter may be brought during the initial making of the concrete or by other products such as de-icing salts or in marine environments. Compositions based on nitrite having a stable pH comprised between about 10 and about 12.5, are particularly efficient. Optionally, adding organic inhibitors to the liquid may further improve the efficiency of the mixture.

In case of treatment of particular porous materials such as concretes comprising reinforcement structures such as metal frames, it may be helpful to determine the concentration of chlorides in the different portions of the material to be treated before the steps of the treatment method of the invention. Indeed, these chlorides are the main responsible for corrosion phenomena of the metal frames. It is then possible to limit the treatment method of the present invention to the areas exhibiting a chloride concentration greater than a certain threshold. Preferably, specific attention will be devoted to treatment of areas in which the chloride ion concentration is greater than 0.1% of Cl$^-$ relatively to the concrete mass.

With the method of the invention, the migration of the liquid may be controlled visually by observing the color of the treated material or the oozing of the liquid at another end of an interface. This observation may be facilitated by adding coloring agents in the treatment liquid.

DESCRIPTION OF A PREFERRED EMBODIMENT OF THE INVENTION

FIG. 1 illustrates a particular embodiment of the method of the invention, applied to the treatment of reinforced or pre-stressed concretes. The system allowing application of the method of the invention includes an injection part 1 comprising an admission tube 4 allowing a liquid to be injected into the compression chamber 5. Said compression chamber 5 is essentially formed by the wall 6 of a cavity made (drilled) in a surface of said material to be treated 2. An outlet tube 8 allows discharge of the treatment liquid. This liquid may be checked and then reinjected.

Penetration of the liquid into the porous material is achieved by emitting a high power acoustic wave generated by means of a pulsating element 7.

The depth at which the pulsating element 7 generates the acoustic wave may be adjusted by sliding a mobile part 3 relatively to the injection part 1. In particular, it is also possible to obtain better cleaning of the porosities, cracks and microcracks present in the porous medium allowing optimization of the penetration of the liquid into said medium.

Figure 2:
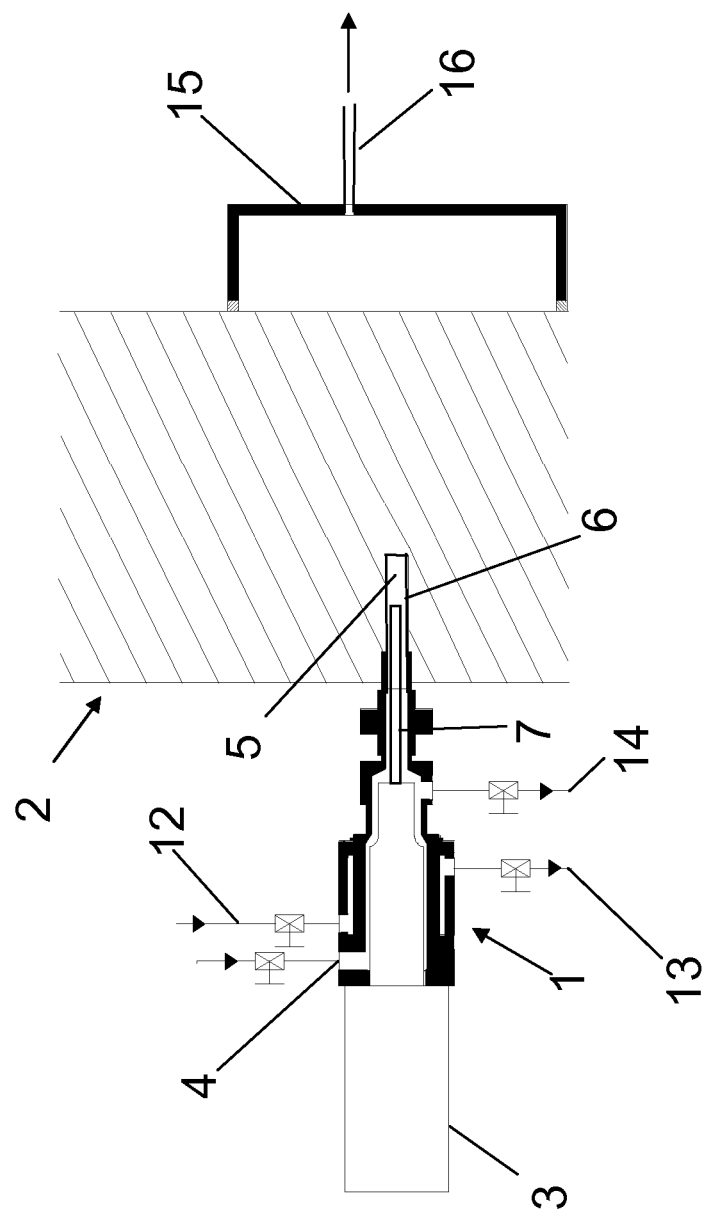
FIG. 2 illustrates a particular embodiment of the invention wherein vacuum is applied on a rear surface opposite to the treated material. Vacuum may also be applied on the front surface surrounding the ultrasonic device.

In a particular embodiment of the invention (FIG. 2), the penetration within the porous material 2 of the liquid is improved by using an enclosure 15 in which vacuum may be generated by means 16 known to one skilled in the art, said enclosure 15 may be positioned on any surface of the material 2 to be treated, as illustrated in FIG. 2, in case of the opposite surface. In the embodiment illustrated in this figure, the injection part 1 used here comprises, in addition to the tube 4 for admission of the treatment liquid, a cooling circuit with an inlet 12 and an outlet 13 for the cooling liquid as well as an outlet tube 14 for the treatment liquid. This outlet tube 14 allows said treatment liquid to circulate in the compression chamber 5, for example with the aim of cooling or monitoring it.

This configuration of the system is preferred, since the generated acoustic power waves may induce significant local heating which may be compensated by the cooling circuit.

It is important to note that the use of the method according to the present invention is not limited to treatments of reinforced concretes with corrosion inhibitors. As the method is non-destructive, this method may also be used in the renovation of buildings listed or not and allows e.g. the treatment of limestones etched by atmospheric pollution, injection of corrosion inhibitors along added frames in buildings listed or not during renovations, etc.

Figure 3:
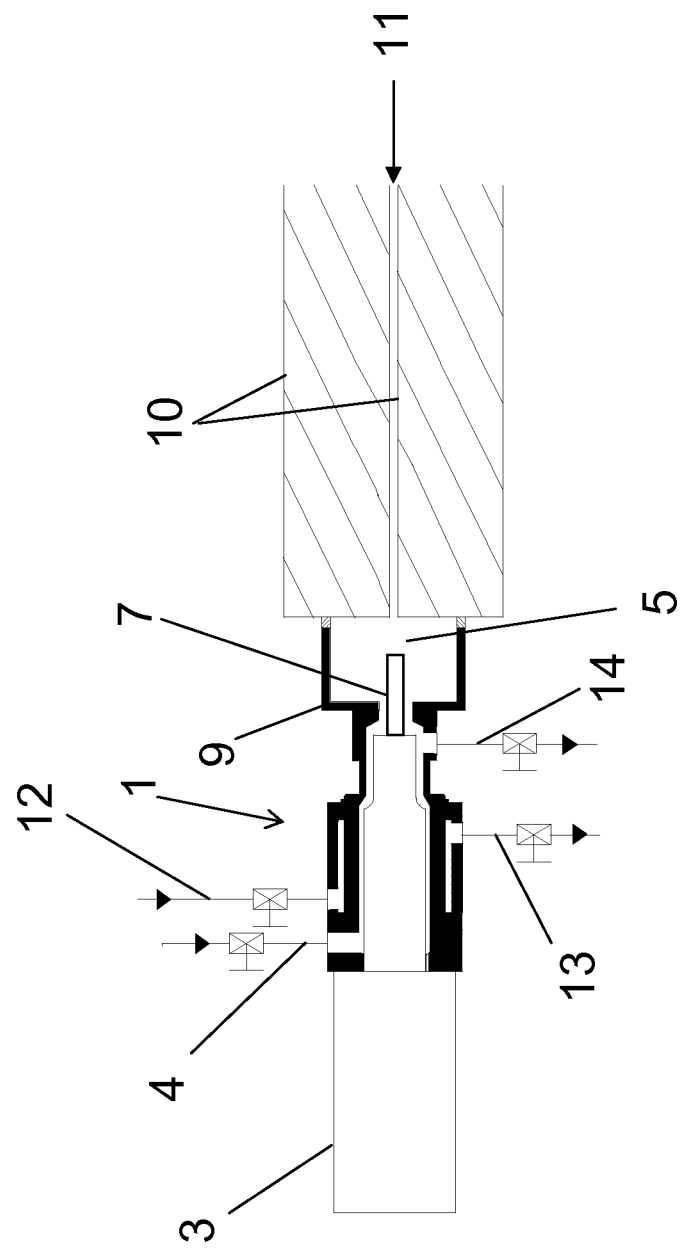
FIG. 3 illustrates a particular embodiment of the invention, wherein the interface between two elements, for example two metal sheets, is treated.

FIG. 3 represents the use of the present method to an interface 11 between two metal plates 10. As described above, means for cooling and renewing the treatment liquid have also been illustrated in this figure.

The invention claimed is:

1. A method for injecting a liquid into a material (2) comprising at least one of pores and discontinuity interfaces, said method comprising the steps of:

attaching an injection part (1) to said material, said injection part (1) delimiting, with at least one surface of said material (6), a compression chamber (5);

injecting said liquid into said compression chamber (5);

applying to said liquid a high power acoustic wave by means of a pulsating element (7), said pulsating element being extended as far as in said compression chamber; and adjusting a depth at which said pulsating element generates said high power acoustic wave in said compression chamber with a sliding support part.

2. The injection method according to claim 1, characterized in that the compression chamber (5) is essentially delimited by the walls (6) of a cavity of the material.

3. The injection method according to claim 2, characterized in that prior to the attachment of the injection part to the material, the cavity is pierced in said material.

4. The injection method according to claim 3, characterized in that the material comprises a metal reinforcement structure(10), and in that the pierced cavity in the material does not open out onto the metal reinforcement structure (10) of said material.

5. The method according to claim 3, characterized in that the material comprises a metal reinforcement structure(10), and in that the pierced cavity in the material opens out onto the metal reinforcement structure of said material.

6. The injection method according to any of the preceding claims, characterized in that said material (2) comprises concrete.

7. The injection method according to claim 6, characterized in that said material comprises one or more metal reinforcement structures (10).

8. The injection method according to claim 7, characterized in that the liquid comprises corrosion inhibitors.

9. The injection method according to claim 7, characterized in that the liquid comprises nitrites and said liquid is at a pH comprised between 10 and 12.5.

10. The injection method of claim 9, characterized in that the liquid comprises a coloring agent.

11. The injection method according to any of claims 1 to 3, characterized in that said material comprises metal assemblies comprising metal-on-metal interfaces (11).

12. The injection method of claim 11, characterized in that the high power acoustic wave has a frequency of more than 20 kHz.

13. The injection method of claim 12, characterized in that one or several vacuum enclosures (15) are used, positioned on one or several surfaces of the material, which are depressurized, thereby promoting transport of the liquid through at least one of the pores in the material (2) and the discontinuity interfaces present in the material (2).

* * * * *